Dec. 1, 1925.
F. E. REINHOLD
1,563,929
ARRANGEMENT FOR PARKING VEHICLES
Filed Sept. 4, 1923        2 Sheets-Sheet 1
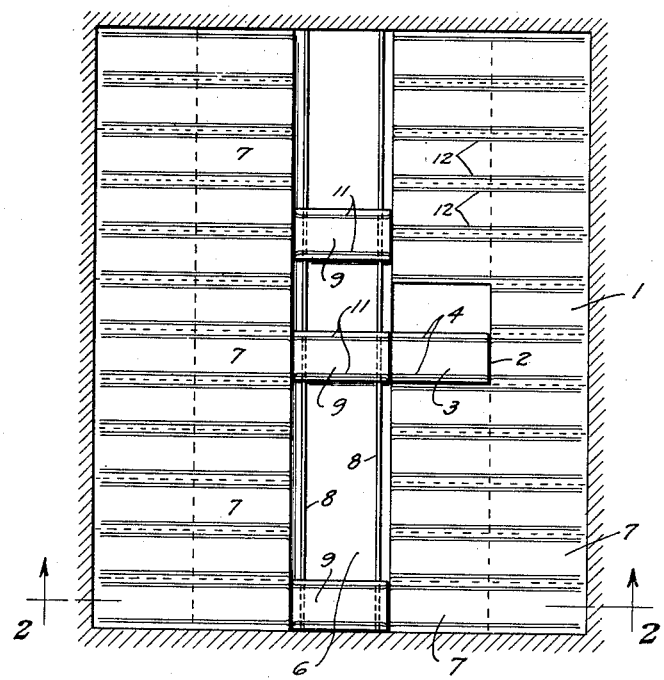
Fig. 1
Fig. 2
Fig. 3
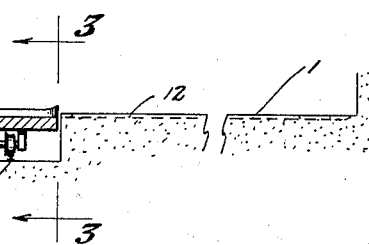
Fig. 4
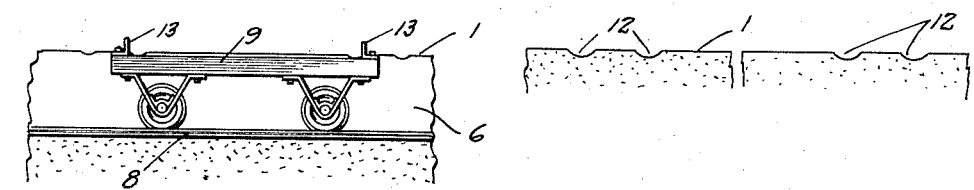
Fig. 5
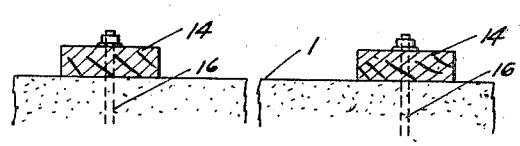
INVENTOR.
Frederick E. Reinhold
BY
Munn & Co
ATTORNEYS.

Dec. 1, 1925.

F. E. REINHOLD 1,563,929

ARRANGEMENT FOR PARKING VEHICLES

Filed Sept. 4, 1923    2 Sheets-Sheet 2

INVENTOR.
Frederick E. Reinhold
BY
ATTORNEYS.

Patented Dec. 1, 1925.

1,563,929

UNITED STATES PATENT OFFICE.

FREDERICK E. REINHOLD, OF LOS ANGELES, CALIFORNIA, ASSIGNOR OF ONE-HALF TO ALBERT E. KELLER, OF LOS ANGELES, CALIFORNIA.

ARRANGEMENT FOR PARKING VEHICLES.

Application filed September 4, 1923. Serial No. 660,838.

*To all whom it may concern:*

Be it known that I, FREDERICK E. REINHOLD, a citizen of the United States, and a resident of Los Angeles, county of Los Angeles, State of California, have invented a new and useful Arrangement for Parking Vehicles, of which the following is a specification.

The present invention relates to improvements in a system for parking automobiles or other motor vehicles, and a particular object of the invention is to disclose an arrangement for allowing the greatest possible number of motor vehicles to be parked in a minimum space.

It is particularly proposed to provide an arrangement in which the machines to be parked may be placed on a truck travelling on a central run-way and distributed over the floor space.

It is further proposed to provide a large number of stalls on both sides of the runway with guide-ways provided on the trucks as well as in the stalls, allowing the motor vehicles to be run from the trucks into the stalls without danger of colliding with vehicles in the adjacent stalls, even though a very small clearance be left between the adjacent cars.

It is further proposed to provide a number of floors, one above the other, with elevators connecting the different floors and allowing the vehicles to be lifted to any floor desired.

It is further proposed to arrange the stalls for the motor vehicles in such a manner that each of the stalls is easy of access. Further objects and advantages of my arrangement will appear as my specification proceeds.

Figure 6:
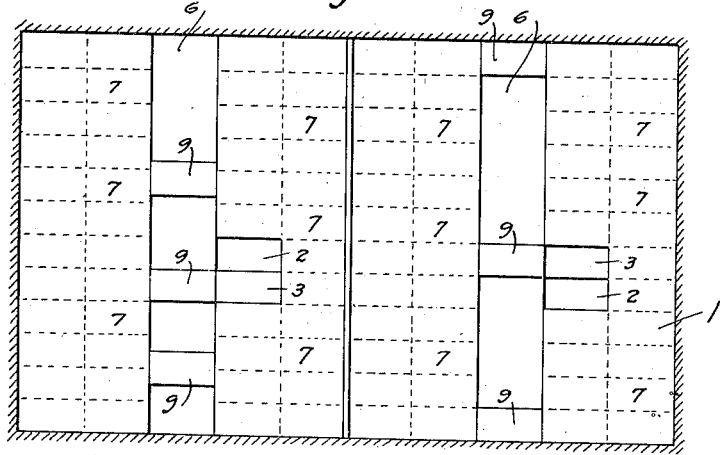
Figure 7:
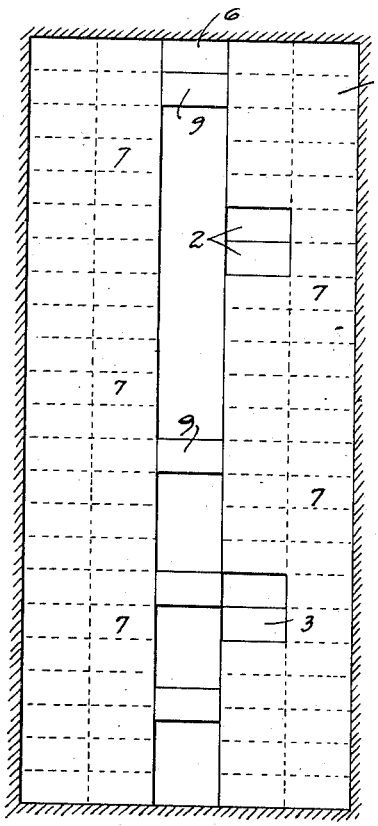
Figure 8:
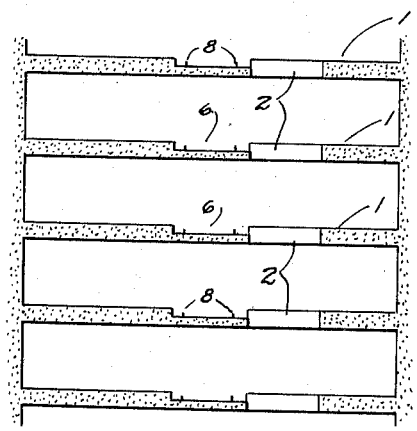

The preferred form of my invention is illustrated in the accompanying drawings, in which Figure 1 shows a plan view of one of my floors; Figure 2, a sectional view taken along line 2—2 of Figure 1; Figure 3, a sectional view taken along line 3—3 of Figure 2; Figure 4, a sectional view taken along line 4—4 of Figure 2; Figure 5, a section corresponding to that of Figure 4, but showing a different rail arrangement; Figure 6, a plan view of two units arranged in side by side relation; Figure 7, a plan view of two units arranged in end to end relation, and Figure 8, a vertical section showing a plurality of floors arranged one above the other.

While I have shown only the preferred form of the invention, I wish to have it understood that various changes or modifications may be made within the scope of the claims hereto attached without departing from the spirit of the invention.

In my system, I preferably arrange a plurality of floors (1) above one another connected by an elevator shaft (2) in which elevators (3) are adapted to move upward and downward in a well known manner. The elevator is provided with guide rails (4) adapted to receive a motor vehicle between the same so that the latter may be moved about without any danger of its leaving a straight path. Each floor is provided with a central runway (6) with stalls (7) disposed on opposite sides of the runway, the stalls being preferably arranged in two rows on each side of the runway so that one row immediately adjoins the run-way, while the second row is separated from the same by the first row. The run-way is provided with rails (8) on which a number of trucks (9) are adapted to move, the trucks being provided with transverse guide-ways (11) adapted to receive a motor vehicle between the same. The stalls are also provided with guide-ways (12) and all the guide-ways on the trucks and on the elevators and in the stalls are of the same width, so that they may be made to register for the purpose of transferring a vehicle from the elevator to the truck and from the truck to the stall.

The guide-ways referred to may be made in any suitable manner and may merely consist of troughs molded in the cement as shown in Figure 4, or of angle irons (13) shown in Figure 3, or of wooden beams (14) secured to the concrete by means of bolts (16), the latter guide-ways being removable.

The units described may be joined laterally as shown in Figure 6, or they may be joined longitudinally as shown in Figure 7. It should be understood that the particular number of elevators and the particular number of stalls selected are not essential in the present invention, and also that variations may be made in the arrangement without departing from the spirit of the invention.

In operation, a vehicle to be parked first enters the ground floor which may be arranged slightly different from the other floors and may be used as a general assembly floor. The vehicle is moved on one of the trucks and the truck is made to register with one of the elevators, whereupon the vehicle is pushed into the elevator and lifted to the floor on which it is to be parked. When reaching this floor, the vehicle is pushed from the elevator on one of the trucks, the truck is made to register with one of the stalls and the vehicle moved into the stall between the guide-ways. It will be understood that the guide-ways would prevent the vehicle from leaving a straight course and from colliding with machines disposed in neighboring stalls. To remove the machine if disposed in one of the stalls adjacent to the run-way, it is merely pushed on the truck, the truck moved to the elevator and the car pushed on the elevator whereupon the elevator is moved downwardly until it reaches the ground floor. If the vehicle is disposed in the second row of stalls and another vehicle is disposed in front of the same, it is necessary to first push the front vehicle on a truck and to move the truck out of the way and to thereafter push the vehicle to be withdrawn on a second truck whereupon the same procedure may be followed.

I claim:

1. A motor vehicle parking arrangement comprising a plurality of floors disposed one above the other, a runway on each floor having guide rails thereon, trucks riding on the guide rails provided with transverse guideways, elevators disposed adjacent to the runways having guideways thereon adapted to be brought into registry with the guideways on the trucks, and stalls arranged on the sides of the runways having guideways therein registering with the guideways on the trucks when the latter are moved into operative positions so as to allow vehicles to be pushed thereinto from the trucks.

2. A motor vehicle parking arrangement comprising a plurality of floors disposed one above the other, a runway on each floor, trucks on the runways, elevators adjacent to the runways adapted to deliver vehicles to the trucks, and stalls adjacent to the runways adapted to have vehicles delivered thereinto from the trucks, the elevators, trucks and stalls being provided with guideways adapted to be brought into registry at operative times.

3. A parking arrangement for automobiles comprising a building having superposed floors, each of which is provided with parallel rows of stalls arranged in pairs, with the stalls of one row of one pair being in end to end relation to the stalls of the other row, a runway separating the pairs of rows of stalls and extending transversely thereof, trucks movable in the runways to register with the stalls of those rows bordering the runway, an elevator movable from one floor to the other and having its shaft opening to said runways, guideways in the stalls, with the guideways of those stalls bordering the runways in longitudinal alinement with the guideways of the remaining stalls, guideways on the trucks adapted to register with the guideways of the stalls bordering the runways, and guideways in the elevator adapted to register with the guideways of the trucks.

FREDERICK E. REINHOLD.